United States Patent
Chuang

(10) Patent No.: US 10,131,393 B2
(45) Date of Patent: Nov. 20, 2018

(54) STORAGE DEVICE FOR BICYCLE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 228 days.

(21) Appl. No.: 15/186,577

(22) Filed: Jun. 20, 2016

(65) Prior Publication Data

US 2017/0057581 A1 Mar. 2, 2017

(30) Foreign Application Priority Data

Aug. 25, 2015 (TW) .............. 104127720 A
Apr. 25, 2016 (TW) .............. 105112870 A

(51) Int. Cl.
*B62J 9/00* (2006.01)
*B62J 9/02* (2006.01)
*B62J 11/00* (2006.01)

(52) U.S. Cl.
CPC .............. *B62J 11/00* (2013.01); *B62J 9/005* (2013.01); *B62J 9/02* (2013.01)

(58) Field of Classification Search
CPC ..... B62J 9/02; B62J 9/005; B62J 11/00; B62J 9/001; B62J 2099/0093
USPC ........................................ 224/414, 418, 426
See application file for complete search history.

(56) References Cited

U.S. PATENT DOCUMENTS

| | | | | |
|---|---|---|---|---|
| 4,366,922 A | * | 1/1983 | Levine ..................... | B62J 11/00 224/414 |
| 4,830,240 A | * | 5/1989 | Tackles ................... | B62J 11/00 224/414 |
| 5,170,981 A | * | 12/1992 | Lin ......................... | B62J 11/00 224/414 |
| 5,217,116 A | * | 6/1993 | Ku ........................... | B62J 9/02 206/374 |
| 5,251,777 A | * | 10/1993 | McMahon ............... | B62J 11/00 220/480 |
| 5,522,527 A | * | 6/1996 | Tsai ......................... | B62J 11/00 224/414 |

(Continued)

FOREIGN PATENT DOCUMENTS

TW M245136 U 10/2004
TW M454970 U 6/2013
(Continued)

*Primary Examiner* — Paul N Dickson
*Assistant Examiner* — Maurice L Williams
(74) *Attorney, Agent, or Firm* — Alan D. Kamrath; Kamrath IP Lawfirm, P.A.

(57) ABSTRACT

A storage device includes an attachment unit and a storage unit. The attachment unit includes a bracket, a support connected with a bottom end of the bracket, and a first joining member. The bracket includes at least one through-hole adapted for attachment to a bicycle by a fastener. The support includes a first pivoting portion, and the first joining member is inserted through the first pivoting portion. The storage unit includes a container adapted for storing articles and a second joining member. The container includes a second pivoting portion pivotally connected with the first pivoting portion of the support. The second joining member is inserted through the second pivoting portion and is engaged with the first joining member. The storage unit is pivotable with respect to the attachment unit about an axis extending through the first and second joining members.

10 Claims, 13 Drawing Sheets

(56) References Cited

U.S. PATENT DOCUMENTS

| | | | | |
|---|---|---|---|---|
| 6,070,897 A * | 6/2000 | Hsieh | B62J 9/02 | 206/207 |
| 6,315,182 B1 * | 11/2001 | Chen | A45F 5/00 | 224/271 |
| 6,520,054 B1 * | 2/2003 | Wang | B25B 13/56 | 224/425 |
| 8,191,844 B2 * | 6/2012 | Pennino | B62J 11/00 | 215/386 |
| 8,220,679 B2 * | 7/2012 | Yoshida | B60R 16/04 | 224/412 |
| 8,770,808 B1 * | 7/2014 | Campbell | B62J 6/04 | 362/473 |
| 8,887,975 B1 * | 11/2014 | Basile | B62J 11/00 | 224/441 |
| 9,643,676 B2 | 5/2017 | Shih | | |
| 9,902,451 B1 * | 2/2018 | Chuang | B62J 9/001 | |
| 2003/0106974 A1 * | 6/2003 | Guertin | B62J 11/00 | 248/309.1 |
| 2005/0156001 A1 * | 7/2005 | Dal Pra | B62J 11/00 | 224/414 |
| 2007/0000961 A1 * | 1/2007 | Chung | B62J 11/00 | 224/425 |
| 2010/0059564 A1 * | 3/2010 | Bretl | A45F 3/16 | 224/414 |
| 2013/0307246 A1 * | 11/2013 | Jankura | B62J 11/00 | 280/281.1 |
| 2014/0182094 A1 * | 7/2014 | Zuraski | B62H 5/00 | 24/456 |
| 2016/0046341 A1 * | 2/2016 | Briney | B62J 11/00 | 224/414 |
| 2018/0037285 A1 * | 2/2018 | Chuang | B62J 1/00 | |
| 2018/0037286 A1 * | 2/2018 | Chuang | B62J 9/006 | |

FOREIGN PATENT DOCUMENTS

| | | | | |
|---|---|---|---|---|
| TW | M504680 U | 7/2015 | | |
| WO | WO-2014060829 A2 * | 4/2014 | | B62J 9/02 |

* cited by examiner

STORAGE DEVICE FOR BICYCLE

BACKGROUND OF THE INVENTION

The present invention relates to a storage device for a bicycle and, more particularly, to a storage device adapted for attaching to a bicycle and capable of storing articles, such as tools, accessories or the like.

Taiwan Utility Patent No. M245,136 discloses a bicycle kettle rack capable of holding tools. The rack includes a base and a kettle positioning member fixed on the base. The base includes a slot assembly adapted to receive tools to not apparently increase the volume of the base. The base is a quad flat and has two end faces. One of the two end faces is provided with the slot assembly, which can include a first slot and a second slot. The end face of the base includes a plurality of deep hole-shaped first slots for storing L-shaped hex keys. The horizontal end of the hex keys extends out of the end face of the base. The base includes two ribs each having a deep hole-shaped second slot for storing tool bits and a tool handle. The base further includes a positioning slot formed at a side edge of the end face and corresponding to a cap adapted to cover the slot assembly formed by the base. The cap faces the positioning slot located on the end face of the base and includes a block removably engaged with the positioning slot.

However, when the base is attached to a down tube of a bicycle (as shown in FIG. 4), and a kettle is received in the positioning member, it is quite troublesome and inconvenient to remove the cap from the base for taking the hex keys out of the slots.

BRIEF SUMMARY OF THE INVENTION

The present invention solves this need and other problems in the field of storage devices for bicycles by providing a storage device including an attachment unit and a storage unit. The attachment unit includes a bracket, a support connected with a bottom end of the bracket, and a first joining member. The bracket includes at least one through-hole adapted for attachment to a bicycle by a fastener. The support includes a first pivoting portion, and the first joining member is inserted through the first pivoting portion. The storage unit includes a container adapted for storing articles and a second joining member. The container includes a second pivoting portion pivotally connected with the first pivoting portion of the support. The second joining member is inserted through the second pivoting portion and is engaged with the first joining member. The storage unit is pivotable with respect to the attachment unit about an axis extending through the first and second joining members.

The first pivoting portion includes an aperture extending therethrough, two first positioning slots and two second positioning slots. The first and second joining members are inserted through the aperture and are connected with each other. The first and second positioning slots are circumferentially arranged around the aperture. One of the first positioning slots is located at one end of the aperture adjacent to the bracket, and the other one of the first positioning slots is located at the other end of the aperture opposite to the bracket. The second pivoting portion includes two first positioning portions engageable in the two first positioning slots or the two second positioning slots. The second joining member is located between the two first positioning portions.

The second pivoting portion further includes two second positioning portions. The first and second positioning portions are circumferentially arranged around the axis with a uniform interval and are peripherally spaced 90 degrees from each other. The first and second positioning slots are circumferentially arranged around the aperture with a uniform interval and peripherally spaced 90 degrees from each other. The second positioning portions are engageable in the two first positioning slots or the two second positioning slots. The first pivoting portion further includes a guiding slot curvely extended around and interconnected with the aperture. The second pivoting portion further includes a guiding portion extended from one end face of the second pivoting portion and located between the second joining member and one of the two first positioning portions. The guiding portion is engageable in the guiding slot corresponding to the pivotable attachment of the storage unit and the attachment unit.

The storage unit further includes a cover, a lever member, and a buckle member. The cover is pivotally connected with the container to form a containing space adapted for storing tools. The lever member is pivotally connected with the cover. The buckle member is pivotally connected with the lever member. The buckle member is engageable with the container. The cover is pivotable with respect to the container to selectively open the containing space.

The cover has a third pivoting portion extended from one end thereof opposite to the containing space. The lever member has an actuated portion and a first pivoting section disposed opposite to the actuated portion. The first pivoting section of the lever member is pivotally connected with the third pivoting portion of the cover.

The container further includes a first buckle portion located on one end thereof adjacent to the second pivoting portion. The lever member further has a second pivoting section located between the actuated portion and the first pivoting section. The buckle member further has a fourth pivoting portion and a second buckle portion disposed opposite to the fourth pivoting portion. The fourth pivoting portion is pivotally connected with the second pivoting section of the lever member. The second buckle portion of the buckle member is engageable with the first buckle portion of the container.

In an example, the container further includes a body portion, a sliding channel, and a sliding portion. The body portion is pivotally connected with the cover to form the containing space. The sliding channel and the sliding portion are formed on the body portion. The first buckle portion is located between the sliding channel and the cover. The sliding portion is located at one end of the second pivoting portion opposite to the first pivoting portion. The sliding channel is engageable with the sliding portion to cause the body portion to be selectively connected to the sliding portion.

The sliding portion has an engaging slot disposed on one end thereof opposite to the second pivoting portion. The storage unit further includes a flexible member arranged at a bottom edge of the sliding channel and forming a flexible end capable of pivoting in relation to the sliding channel. The flexible member includes an engaging portion and a pressing portion both located at the flexible end and extending opposite to the body portion. The engaging portion is engageable with the engaging slot as the flexible end is pivoted. The pressing portion is adapted to be pressed by a user for pivoting the flexible end.

In another example, the support is integrally formed with a bottom end of the bracket. The bracket includes two through-holes. The attachment unit further includes two symmetrical struts each having a bottom end integrally formed with one end of the support distal the bracket and a top end integrally formed with a respective side edge of the bracket. The bracket, the support, and the two struts form a receiving space adapted to hold a water bottle.

In a further example, the bracket has an elongated portion and a connecting portion integrally formed with each other and perpendicular to each other. The bracket includes two through-holes extending through the elongated portion and adapted for attachment by a fastener to a bicycle. The support has a recess disposed opposite to the first pivoting portion. The connecting portion is inserted into the recess. The bracket is connected with the support.

The support has a threaded hole interconnected with the recess. The attachment unit has a threaded member extending through the connecting portion of the bracket and engaged with the threaded hole of the support.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
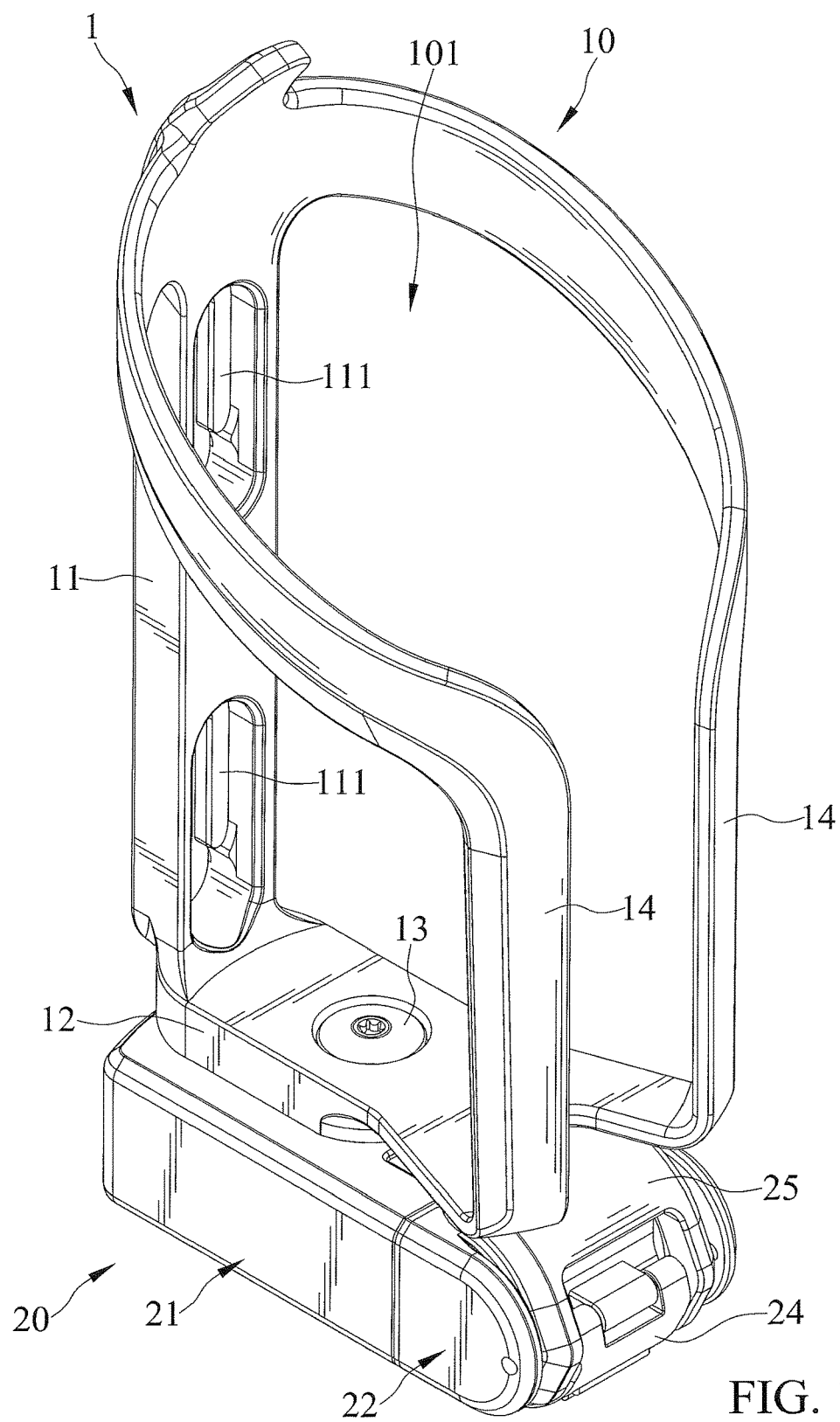
FIG. 1 shows a perspective view of a storage device of a first embodiment according to the present invention.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

Figure 2:
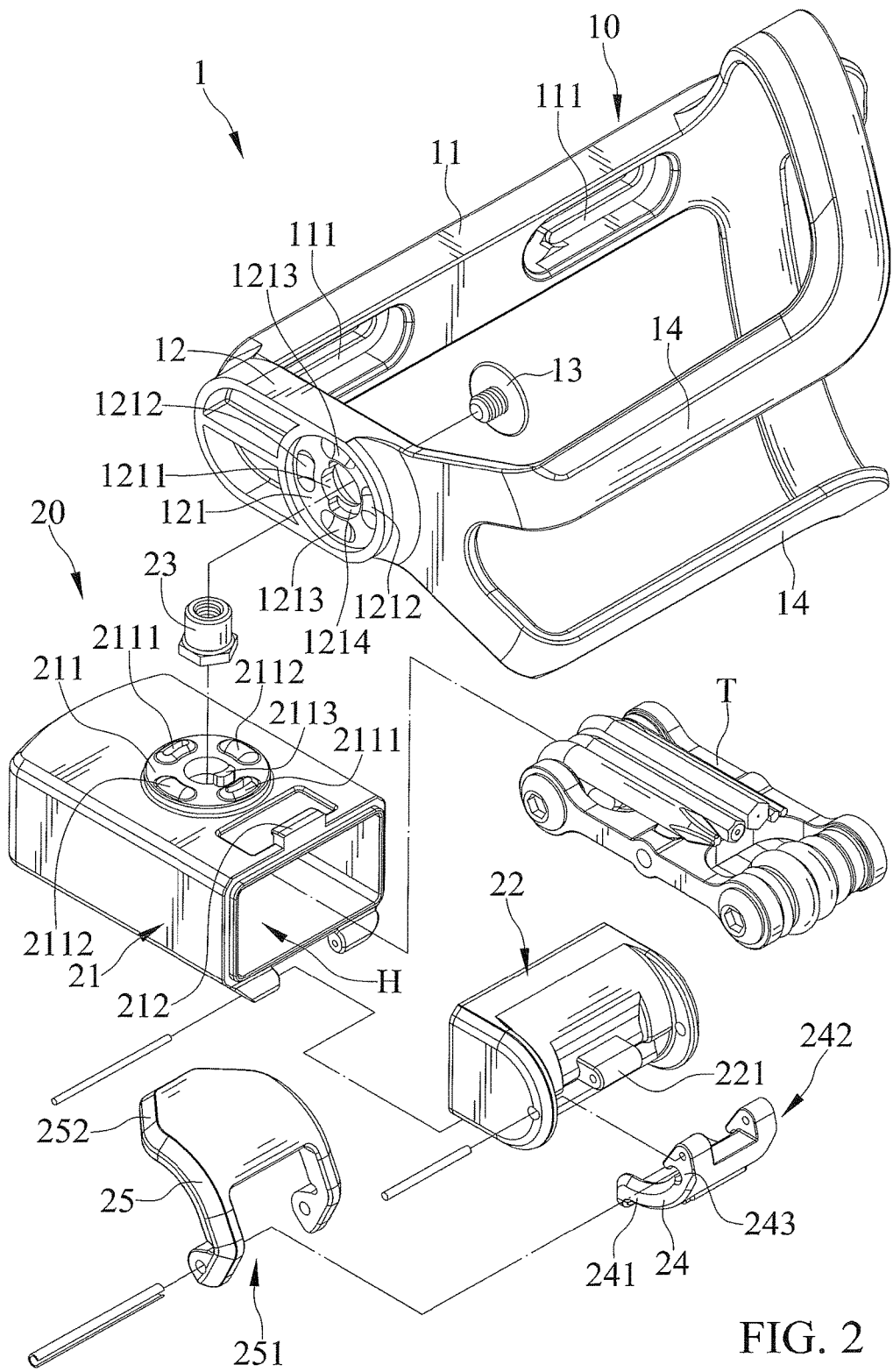
FIG. 2 shows an exploded, perspective view of the storage device of FIG. 1.
Figure 3:
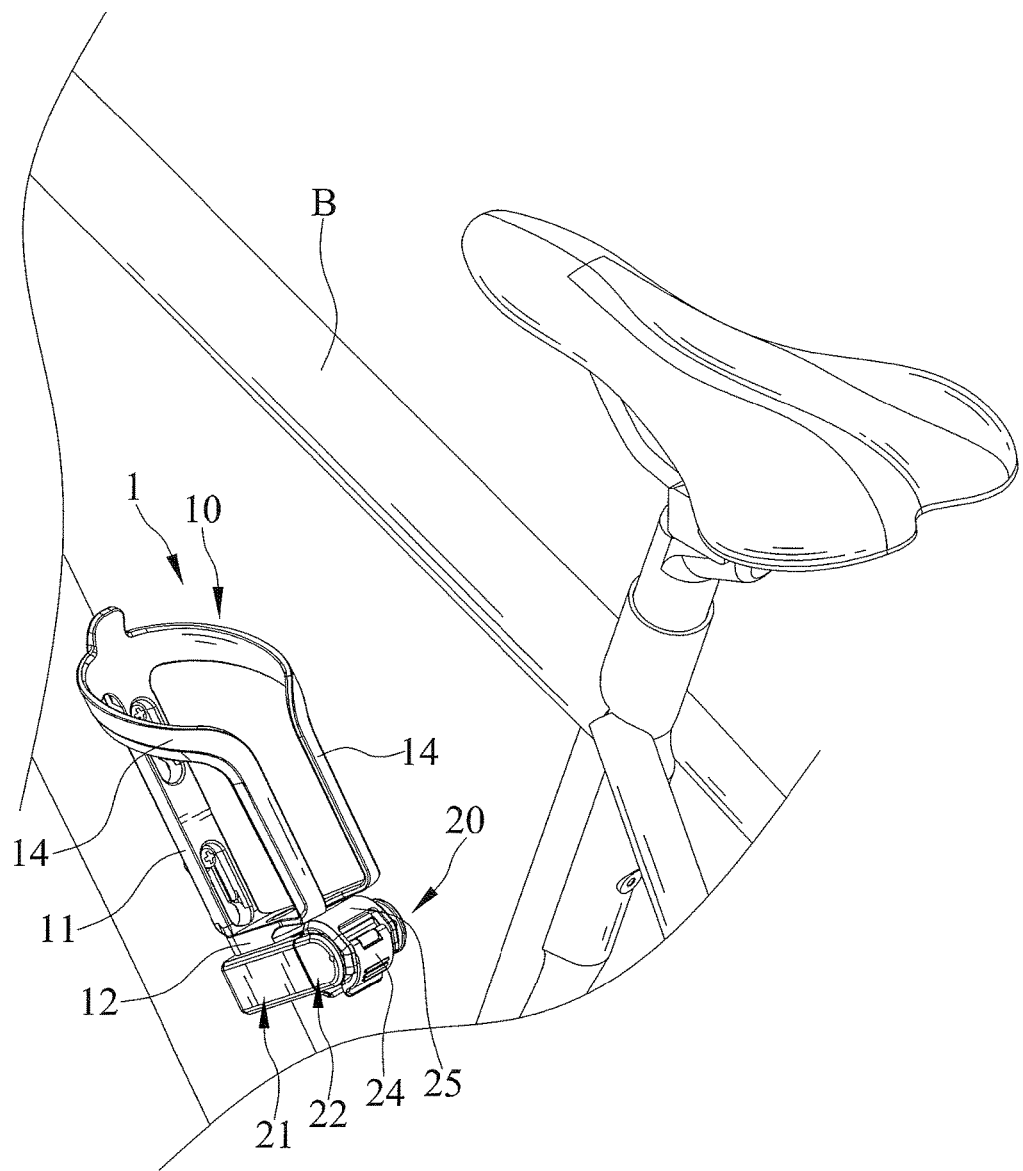
FIG. 3 shows a perspective view of the storage device of FIG. 1, and illustrates the storage device attached to a bicycle and located in a first position.

FIGS. 1-7 show a storage device 1 of a first embodiment according to the present invention. The storage device 1 includes an attachment unit 10 and a storage unit 20 pivotally connected to the attachment unit 10. The attachment unit 10 can be attached to a bicycle B (as shown in FIG. 3) and can hold a water bottle (not shown). The storage unit 20 can store articles, such as a multi bicycle tool T (as shown in FIG. 2).

The attachment unit 10 includes a bracket 11, a support 12 connected with a bottom end of the bracket 11, a first joining member 13, and two symmetrical struts 14 each having a bottom end integrally formed with one end of the support 12 distal the bracket 11 and a top end integrally formed with a respective side edge of the bracket 11. Thus, the bracket 11, the support 12, and the two struts 14 form a receiving space 101 adapted to hold a water bottle. In the embodiment, the first joining member 13 can be a bolt.

Figure 4:
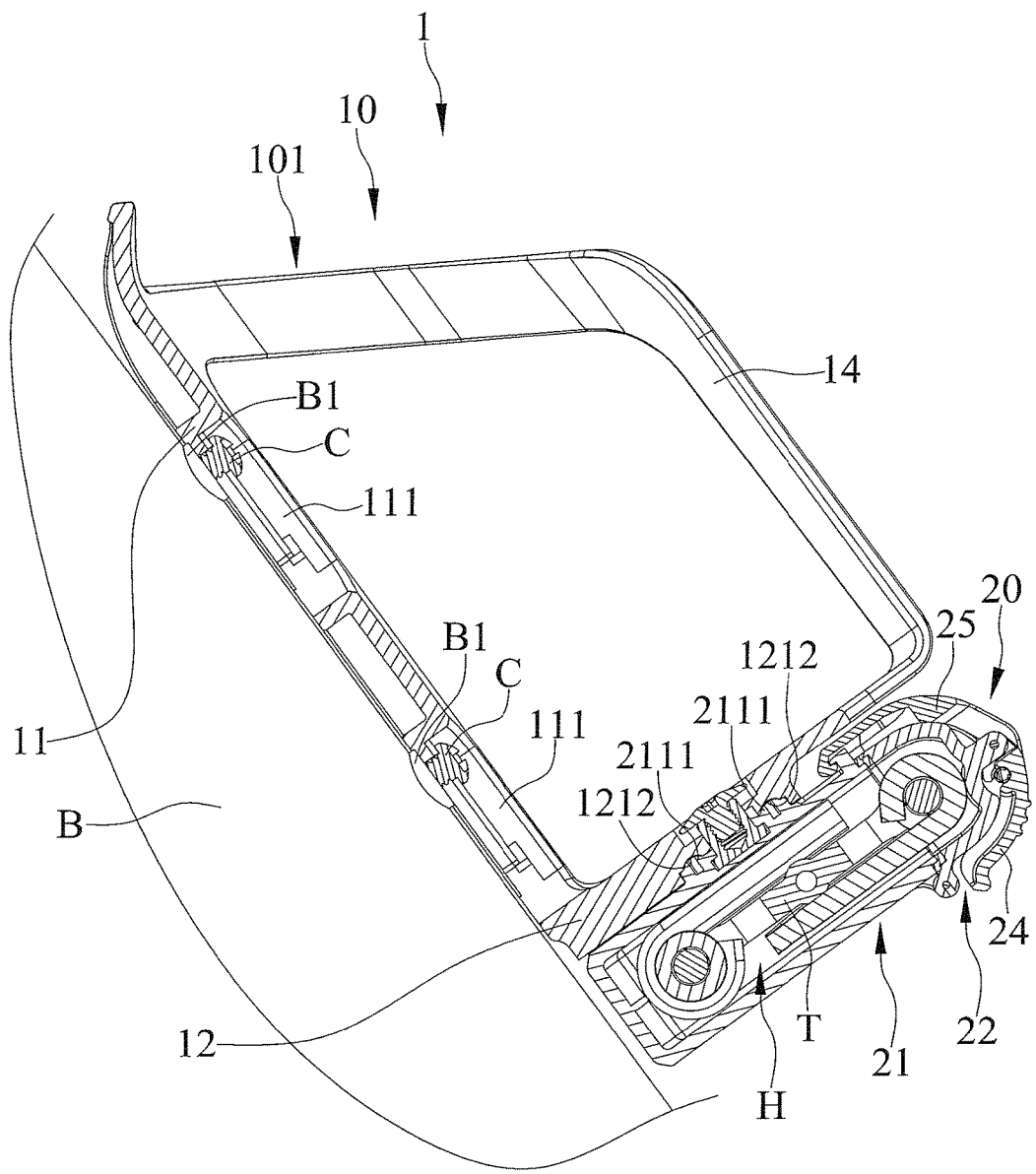
FIG. 4 shows a partial, enlarged cross sectional view of the storage device of FIG. 3.

The bracket 11 includes at least one through-hole 111 extending therethrough and adapted for attachment with a screw hole B1 of a bicycle B by a screw C (as shown in FIG. 4). In the embodiment, the bracket 11 includes two through-holes 111.

The support 12 includes a first pivoting portion 121 pivotally connected with the storage unit 20 and having an aperture 1211, two first positioning slots 1212, two second positioning slots 1213, and a guiding slot 1214.

The aperture 1211 extends through the first pivoting portion 121. The two first positioning slots 1212 and the two second positioning slots 1213 are circumferentially arranged around the aperture 1211. One of the two first positioning slots 1212 is located at one end of the aperture 1211 adjacent to the bracket 11, and the other one of the two first positioning slots 1212 is located at the other end of the aperture 1211 opposite to the bracket 11. In a preferred form, the first and second positioning slots 1212 and 1213 are circumferentially arranged around the aperture 1211 with a uniform interval and are peripherally spaced 90 degrees from each other. The guiding slot 1214 is curvely extended around and is interconnected with the aperture 1211. The first joining member 13 is inserted through the aperture 1211 of the first pivoting portion 121 and is engaged with a second joining member 23 of the storage unit 20. Thus, the storage unit 20 is pivotable with respect to the attachment unit 10 about an axis extending through the first and second joining members 13 and 23.

The storage unit 20 includes a container 21, a cover 22, a second joining member 23, a lever member 24, and a buckle member 25. The cover 22 is pivotally connected with the container 21 to form a containing space H capable of storing the tool T. The cover 22 is pivotable with respect to the container 21 to selectively open the containing space H. The lever member 24 is pivotally connected with the cover 22. The buckle member 25 is pivotally connected with the lever member 24 and is engageable with the container 21. The second joining member 23 is inserted through the container 21 and the aperture 1211 of the first pivoting portion 121 to be engaged with the first joining member 13. In the embodiment, the second joining member 23 can be a nut.

The container 21 includes a second pivoting portion 211 and a first buckle portion 212 both located at on end thereof adjacent to the attachment unit 10. The first buckle portion 212 is disposed between the second pivoting portion 211 and the cover 22. The second joining member 23 is inserted through the second pivoting portion 211 pivotally connected with the first pivoting portion 121. The second pivoting portion 211 includes two first positioning portions 2111, two second positioning portions 2112, and a guiding portion 2113. The first and second positioning portions 2111 and 2112 are circumferentially arranged around the axis with a uniform interval and are peripherally spaced 90 degrees from each other. The second joining member 23 is located between the two first positioning portions 2111 and the two second positioning portions 2112. One of the two first positioning portions 2111 is located at one end of the second joining member 23 adjacent to the cover 22, and the other one of the two first positioning portions 2111 is located at another end of the second joining member 23 opposite to the cover 22. The two first positioning portions 2111 are engageable in the two first positioning slots 1212 or the two second positioning slots 1213. When the two first positioning portions 2111 are engaged in the two first positioning slots 1212, the two second positioning portions 2112 are engaged in the two second positioning slots 1213. Otherwise, when the two first positioning portions 2111 are engaged in the two second positioning slots 1213, the two second positioning portions 2112 are engaged in the two first positioning slots 1212. The guiding portion 2113 is extended from one end face of the second pivoting portion 211 and is located between the second joining member 23 and one of the two first positioning portions 2111 adjacent to the cover 22. The guiding portion 2113 is engageable in the guiding slot 1214 corresponding to the pivotable attachment of the storage unit 20 and the attachment unit 10.

The cover 22 has a third pivoting portion 221 extended from one end thereof opposite to the containing space H. The lever member 24 has an actuated portion 241, a first pivoting section 242 disposed opposite to the actuated portion 241, and a second pivoting section 243 located between the actuated portion 241 and the first pivoting section 242. The first pivoting section 242 is pivotally connected with the third pivoting portion 221 of the cover 22. Thus, a user can pull the actuated portion 241 to cause the lever member 24 to be pivoted with respect to the third pivoting portion 221. The buckle member 25 has a fourth pivoting portion 251 and a second buckle portion 252 disposed opposite to the fourth pivoting portion 251. The fourth pivoting portion 251 is pivotally connected with the second pivoting section 243 of the lever member 24. The second buckle portion 252 of the buckle member 25 is engageable with the first buckle portion 212 of the container 21.

The storage unit 20 can be located in a first position or a second position. When the storage unit 20 is located in the first position (as shown in FIG. 3), the cover 22 and the bracket 11 are disposed opposite to each other. The two first positioning portions 2111 are engaged in the two first positioning slots 1212, and the two second positioning portions 2112 are engaged in the two second positioning slots 1213. The buckle member 25 is located between the support 12 and the cover 22, so that the cover 22 can not be casually pivoted with respect to the container 21 to be unable to open the containing space H, preventing the tool T from dropping down from the container 21.

Figure 5:
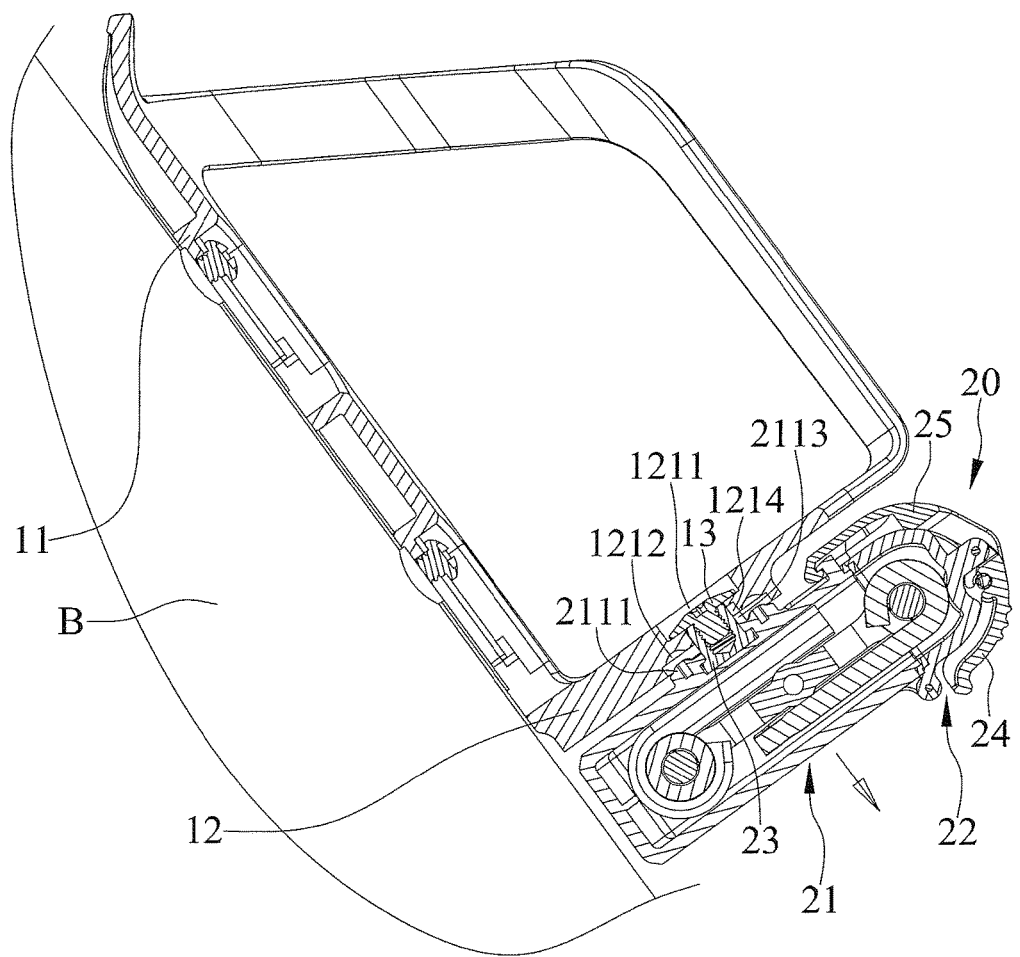
FIG. 5 is a continued view of FIG. 4, and illustrates the storage unit moved in relation to an attachment unit along an arrow and then pivoted with respect to the attachment unit from the first position to a second position.
Figure 6:
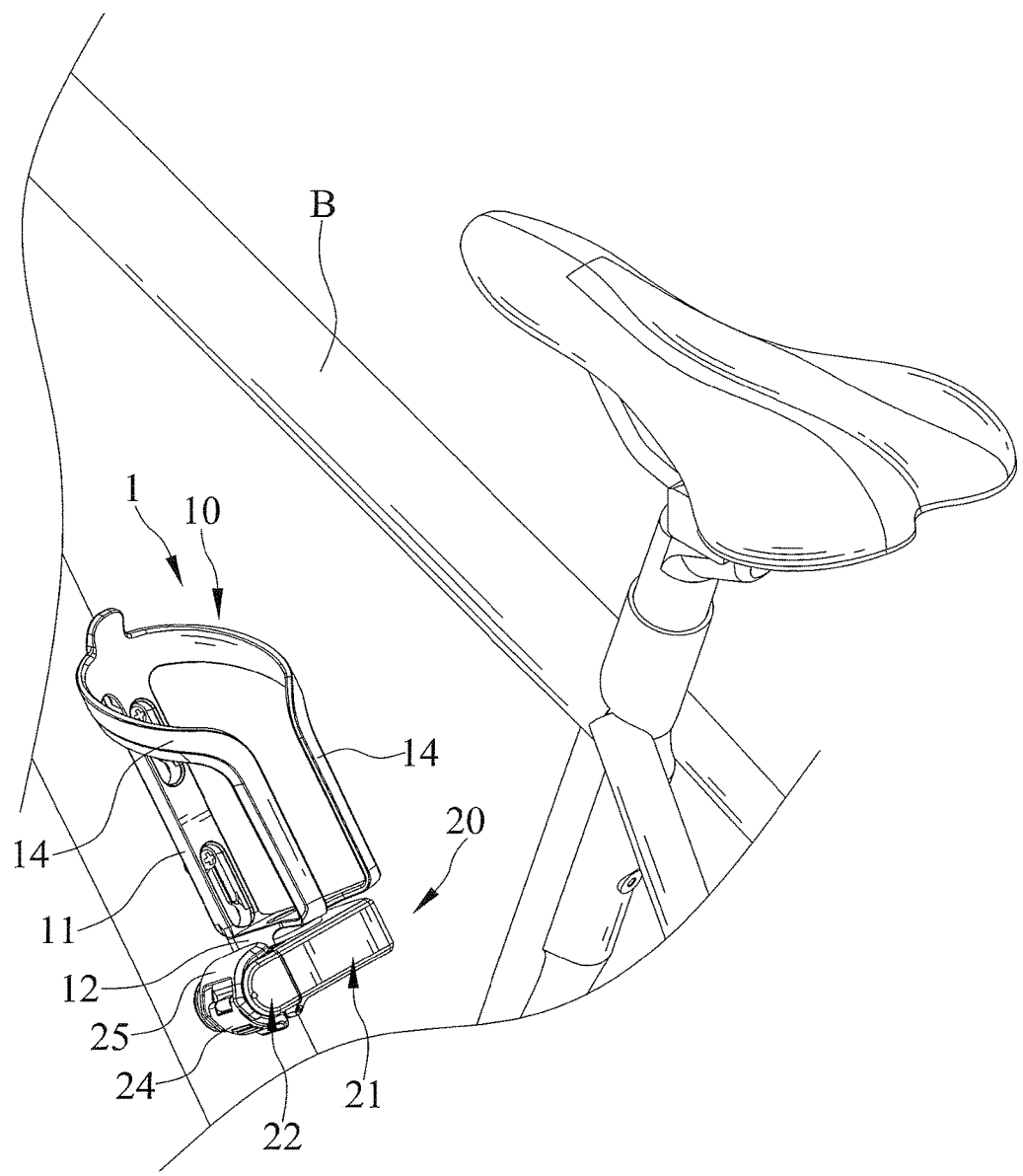
FIG. 6 shows a perspective view of the storage device of FIG. 3, and illustrates the storage unit positioned in the second position.
Figure 7:
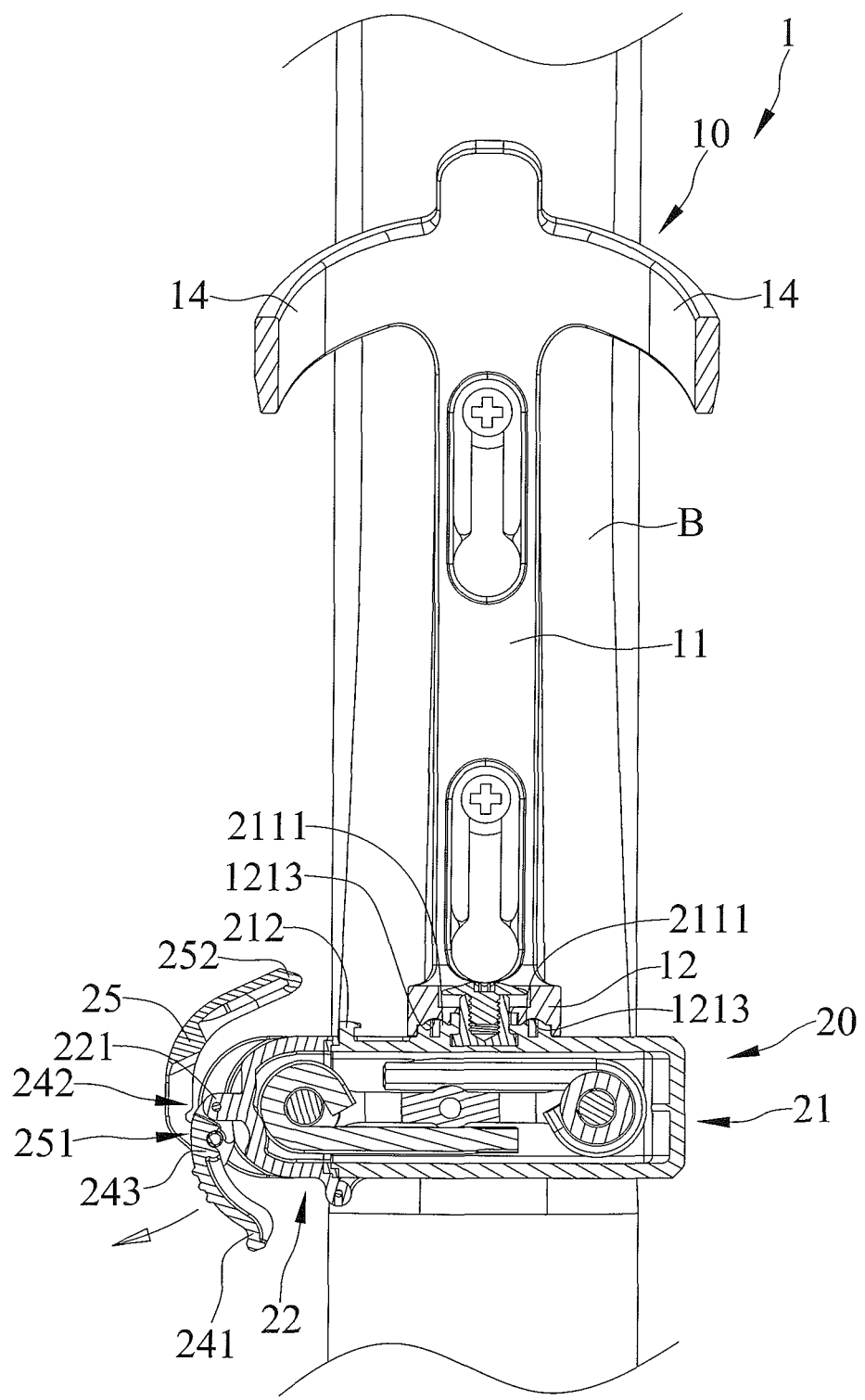
FIG. 7 shows a partial, enlarged cross sectional view of the storage device of FIG. 6, and illustrates a lever member pivoted with respect to a cover to cause a buckle member disengaged from a container, and then the cover can be pivoted with respect to the container.

The storage unit 20 can be moved in relation to the attachment unit 10 (as shown in FIG. 5). The first and second joining members 13 and 23 both slide in relation to the aperture 1211. Thus, the two first positioning portions 2111 are disengaged from the two first positioning slots 1212, and the two second positioning portions 2112 are disengaged from the two second positioning slots 1213. The storage unit 20 can be pivoted 90 degrees in relation to the attachment unit 10. The two first positioning portions 2111 are engaged in the two second positioning slots 1213, and the two second positioning portions 2112 are engaged in the two first positioning slots 1212. The guiding portion 2113 is engaged in the guiding slot 1214 to cause the storage unit 20 not to be casually pivoted with respect to the attachment unit 10. Finally, the storage unit 20 is located in the second position (as shown in FIG. 6). The two first positioning portions 2111 are engaged in the two second positioning slots 1213, and the two second positioning portions 2112 are engaged in the two first positioning slots 1212. The user can pull the actuated portion 241 of the lever member 24. The first pivoting section 242 is pivoted with respect to the third pivoting portion 221 of the cover 22, and the second pivoting section 243 is moved toward the attachment unit 10. The fourth pivoting portion 251 is pivoted with respect to the second pivoting section. 243 of the lever member 24 to cause the second buckle portion 252 of the buckle member 25 to be disengaged from the first buckle portion 212 of the container 21. The cover 22 is pivoted with respect to the container 21 to open the containing space H.

Figure 8:
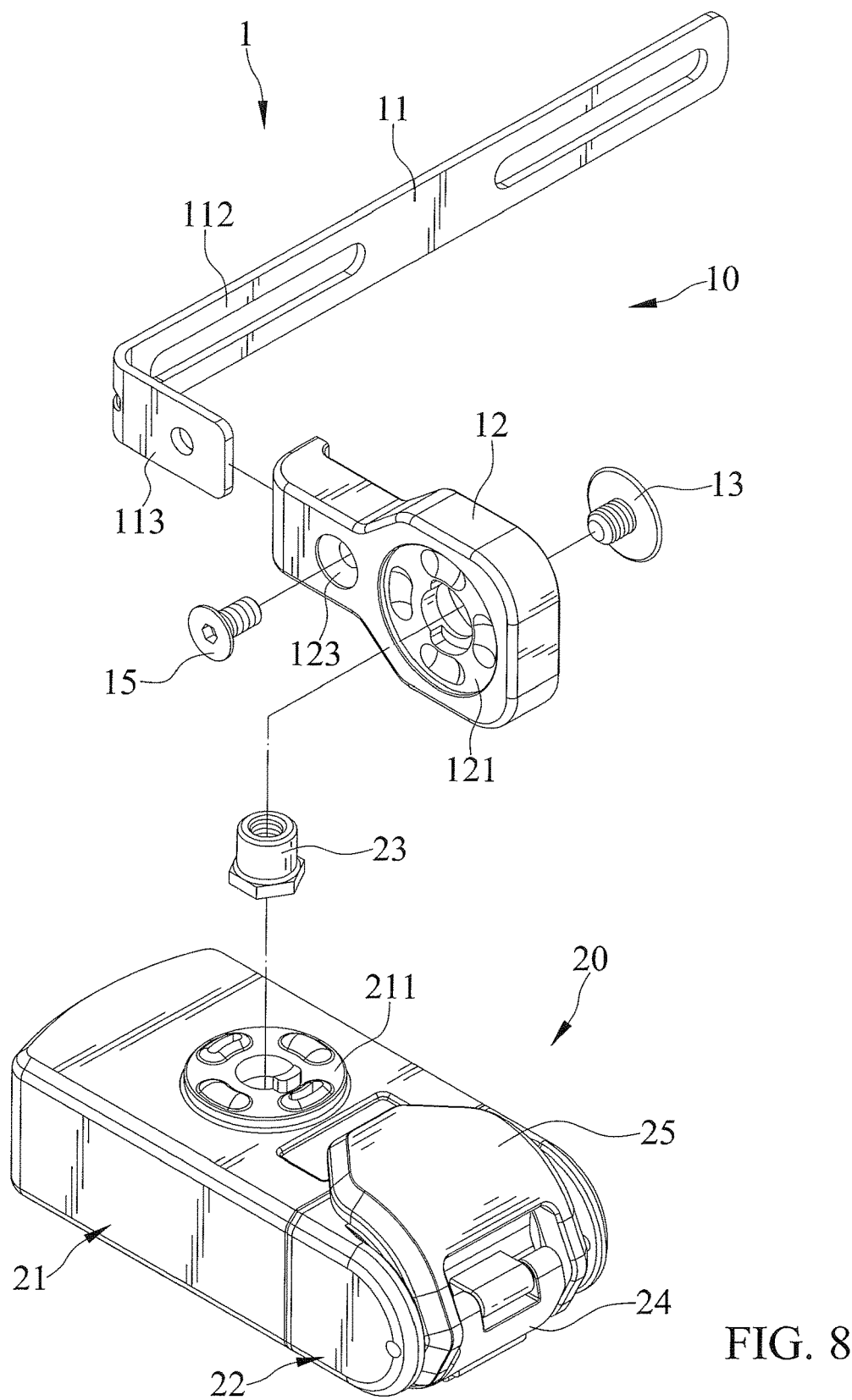
FIG. 8 shows an exploded, perspective view of a storage device of a second embodiment according to the present invention.
Figure 9:
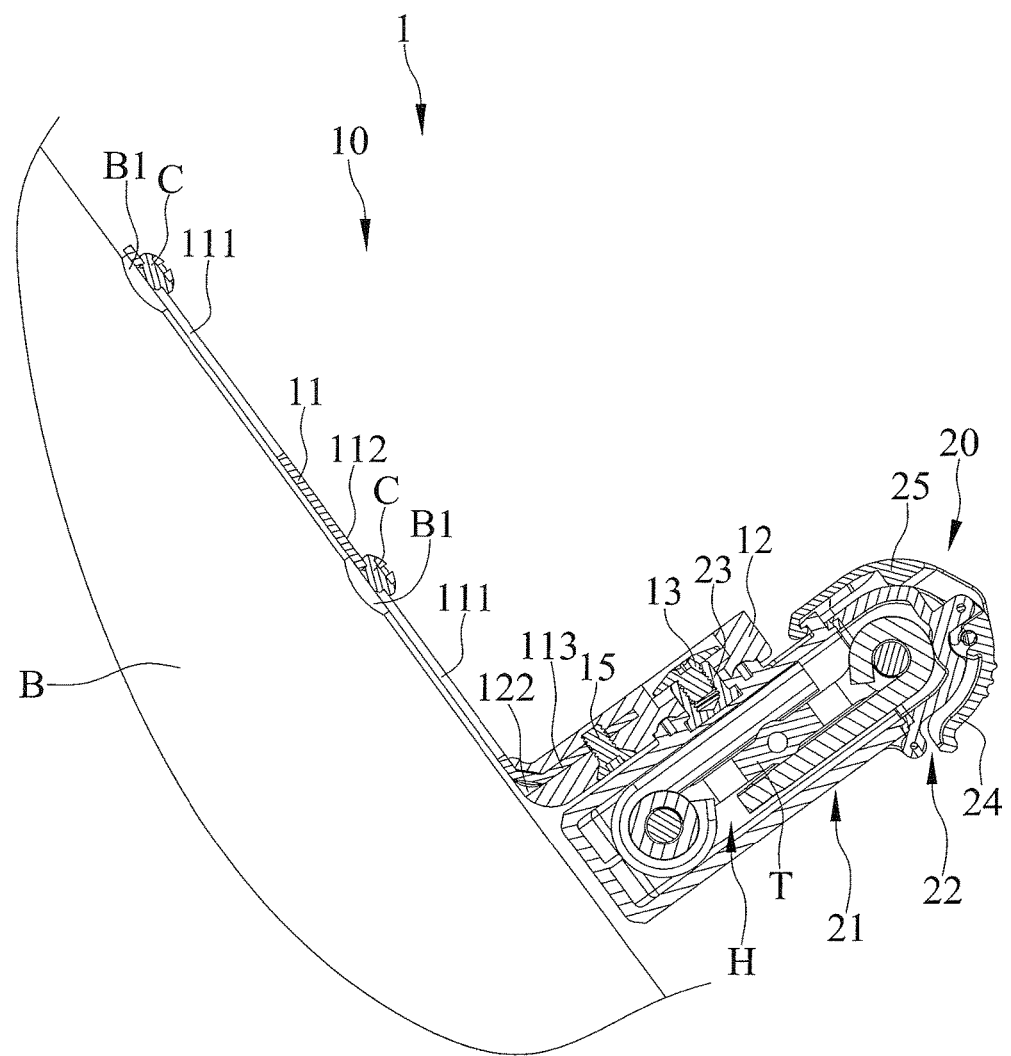
FIG. 9 shows a partial, enlarged cross sectional view of the storage device of FIG. 8, and illustrates the storage device.
Figure 10:
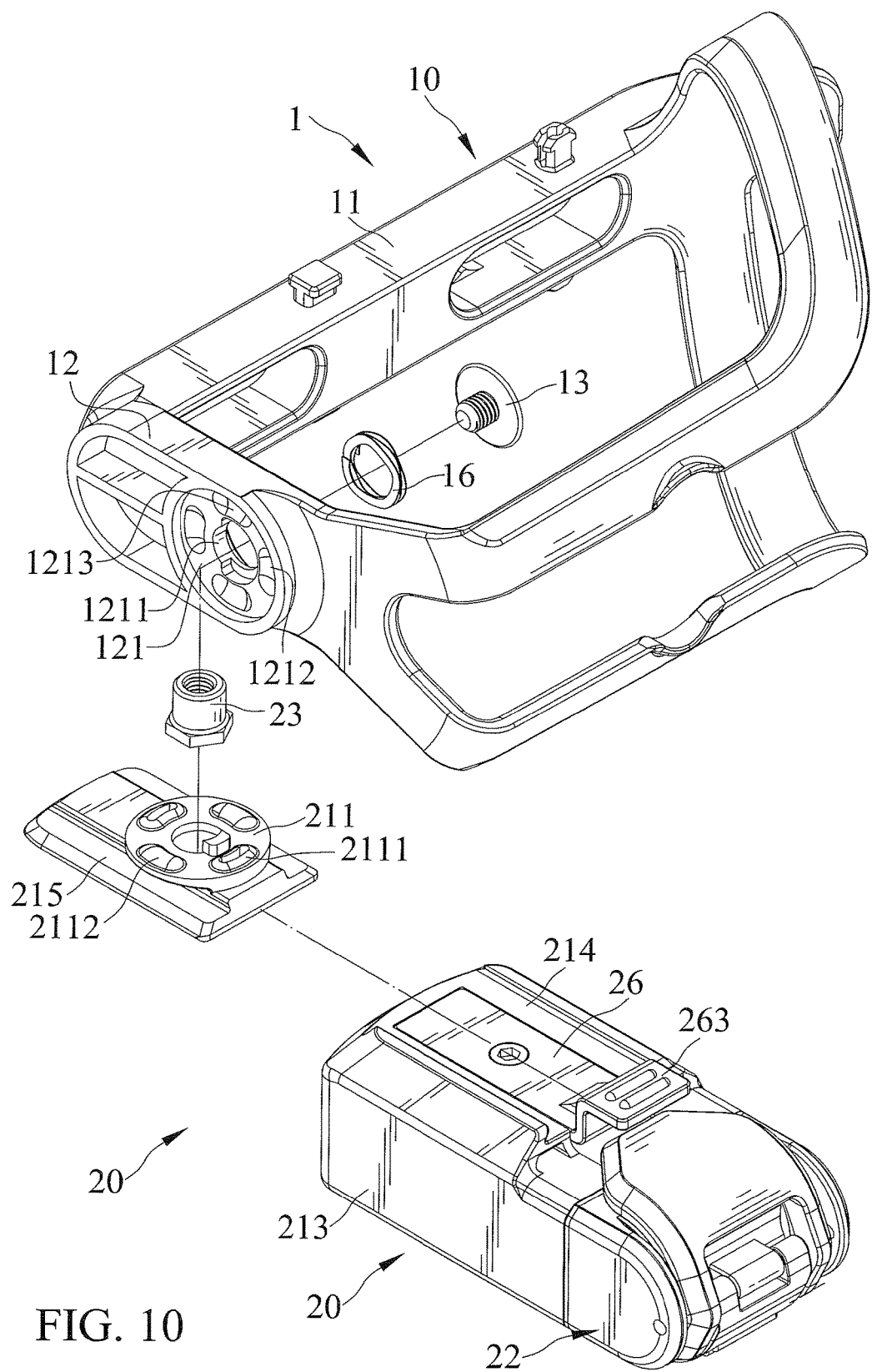
FIG. 10 shows an exploded, perspective view of a storage device of a third embodiment according to the present invention.

FIGS. 8 and 9 show a storage device 1 of a second embodiment according to the present invention. In the embodiment, the attachment unit 10 includes a bracket 11, a support 12 connected with the bracket 11, a first joining member 13, and a threaded member 15. The threaded member 15 extends through the bracket 11 and is engaged with the support 12.

The bracket 11 includes at least one through-hole 111 extending therethrough. In the embodiment, the bracket 11 includes two through-holes 111. The bracket 11 is bent to form an elongated portion 112 and a connecting portion 113. The two through-holes 111 are formed and extended through the elongated portion 112. The support 12 has a first pivoting portion 121, a recess 122 disposed opposite to the first pivoting portion 121, and a threaded hole 123 interconnected with the recess 122. The connecting portion 113 is inserted into the recess 122. The threaded member 15 extends through the connecting portion 113 of the bracket 11 and is engaged with the threaded hole 123 of the support 12 to connect the bracket 11 to the support 12.

FIGS. 10-13 show a storage device 1 of a third embodiment according to the present invention. In the embodiment, the container 21 includes a body portion 213, a sliding channel 214, and a sliding portion 215. The body portion 213 is pivotally connected with the cover 22 to form the containing space H. The sliding channel 214 and the sliding portion 215 are formed on the body portion 213. The first buckle portion 212 is located between the sliding channel 214 and the cover 22. The sliding portion 215 is located at one end of the second pivoting portion 211 opposite to the first pivoting portion 121. The sliding channel 214 is engageable with the sliding portion 215 to cause the body portion 213 to be selectively connected to the sliding portion 215. The sliding portion 215 has an engaging slot 2151 disposed on one end thereof opposite to the second pivoting portion 211. In the embodiment, the sliding channel 214 has a dovetail shaped cross section, and the sliding portion 215 has a dovetail shaped cross section corresponding to the sliding channel 214.

The storage unit 20 further includes a flexible member 26 arranged at a bottom edge of the sliding channel 214 and forming a flexible end 261 capable of pivoting in relation to the sliding channel 214. The flexible member 26 includes an engaging portion 262 and a pressing portion 263 both located at the flexible end 261 and extending opposite to the body portion 213. The engaging portion 262 is engageable with the engaging slot 2151 as the flexible end 261 is pivoted, and the pressing portion 263 is adapted to be pressed by the user for pivoting the flexible end 261. In the embodiment, a bolt is inserted through the flexible member 26 and is engaged with the body portion 213, so that the flexible member 26 is located on a bottom edge of the sliding channel 214.

In the embodiment, the attachment unit 10 further includes an elastic member 16 received in the aperture 1211 of the support 12 and arranged around the first joining member 13. The elastic member 16 is elastically abutted against the first joining member 13 to cause the second pivoting portion 211 to abut against the first pivoting portion 121. The elastic member 16 also may be applied in the first and second embodiment of the present invention.

Figure 11:
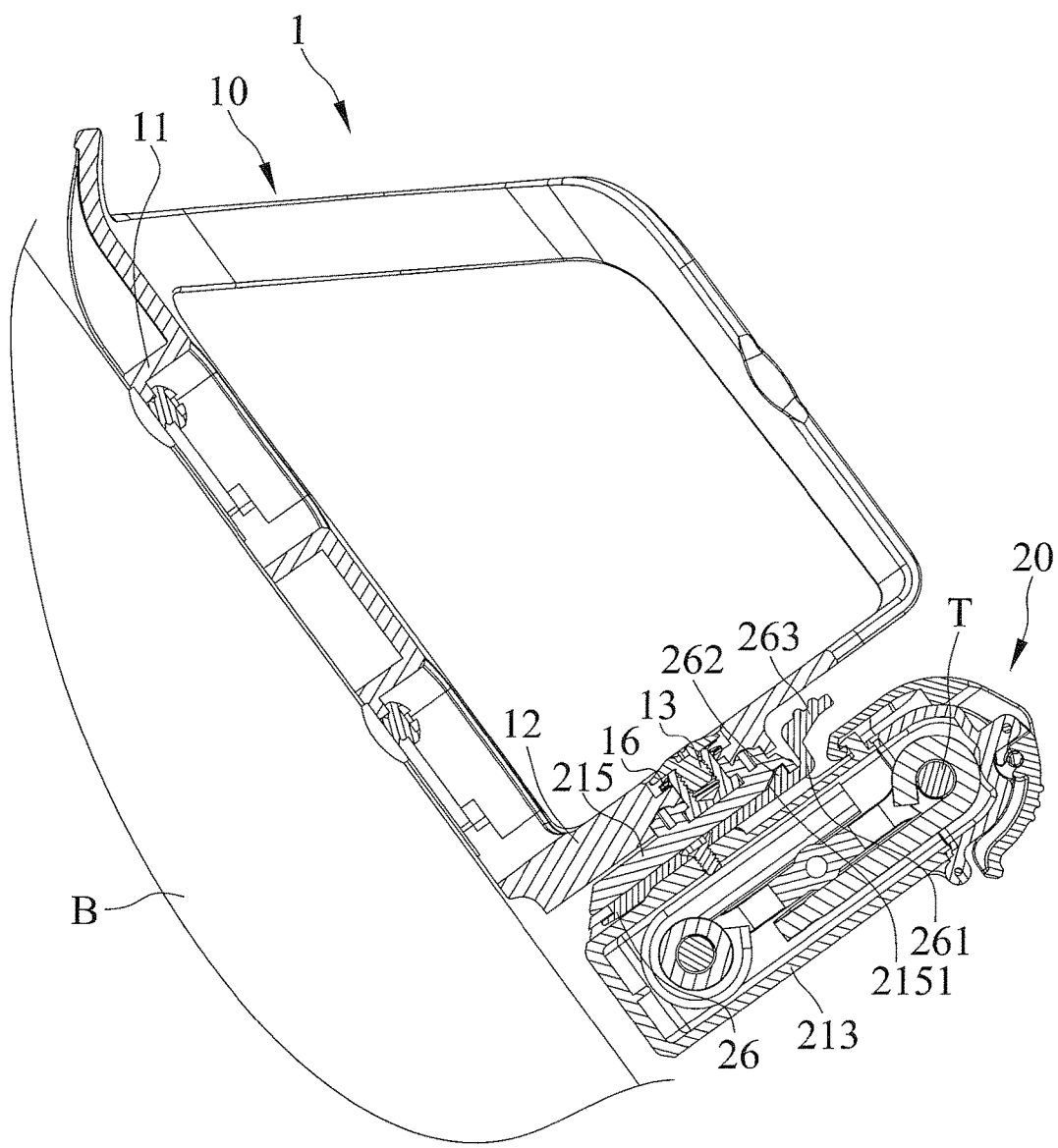
FIG. 11 shows a partial, enlarged cross sectional view of the storage device of FIG. 10, and illustrates the storage device located in a first position.
Figure 12:
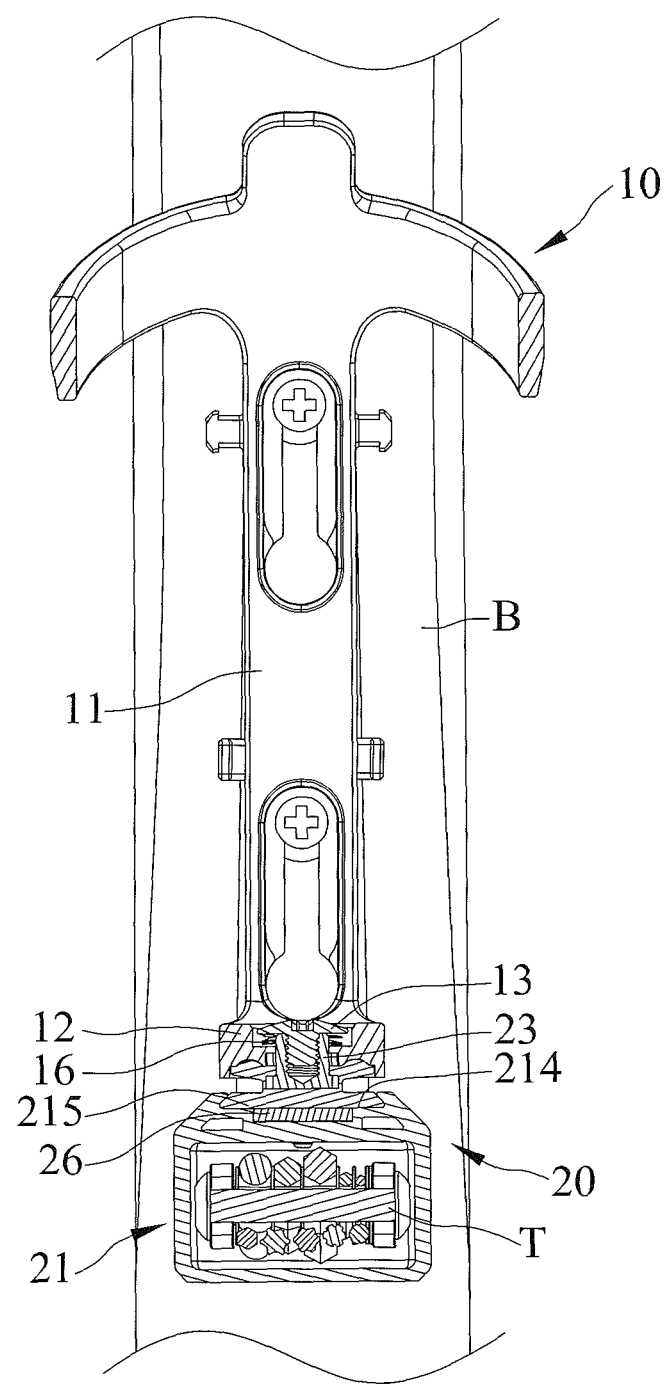
FIG. 12 shows another partial, enlarged cross sectional view of the storage device of FIG. 10, and illustrates the storage device located in a first position.
Figure 13:
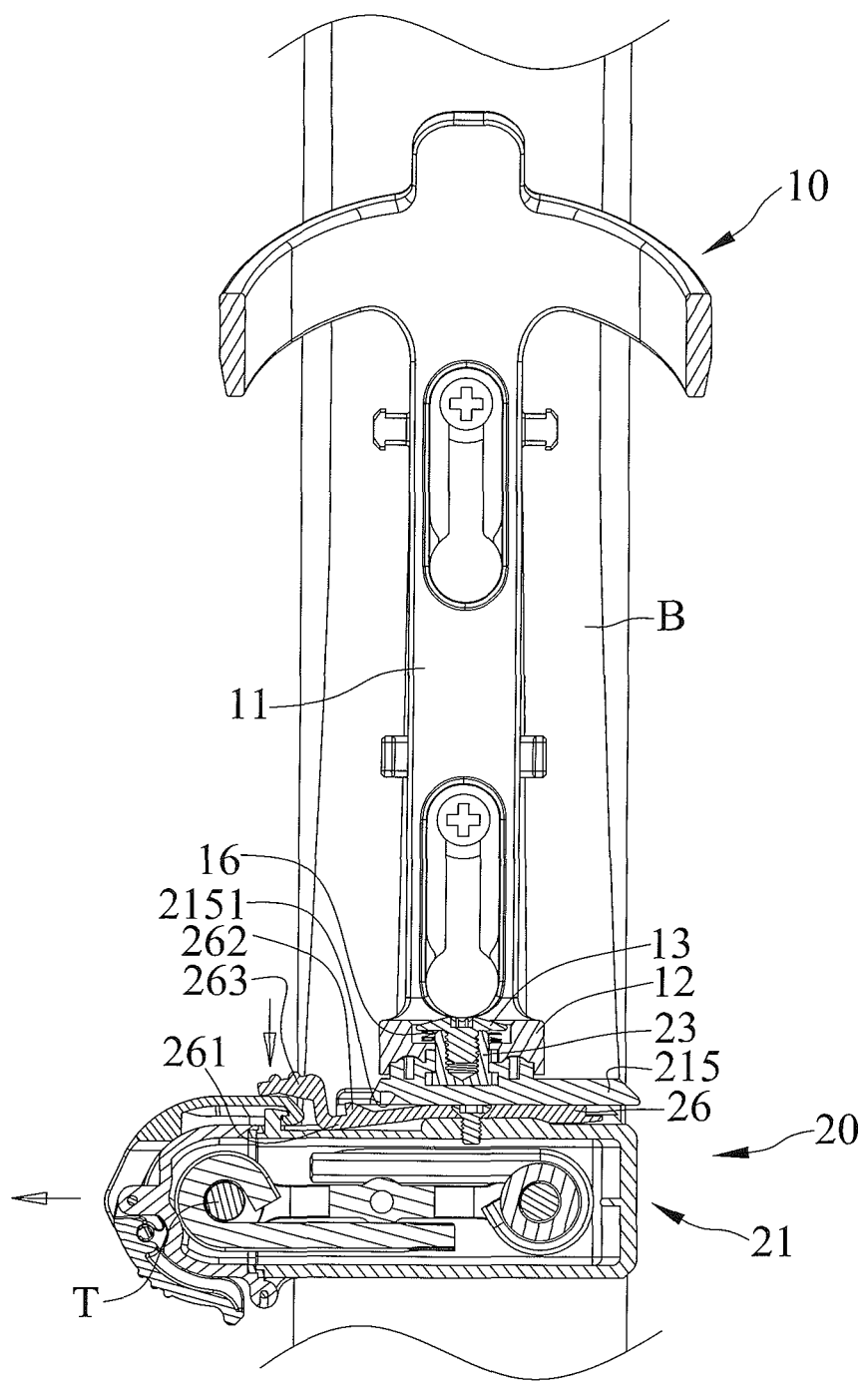
FIG. 13 is a continued view of FIG. 12, and illustrates the storage device located in a second position.

The storage unit 20 can be located in a first position (as shown in FIG. 11) or a second position (as shown in FIG. 13). When the storage unit 20 is located in the first position, the pressing portion 263 of the flexible member 26 is covered by the support 12 to prevent the pressing portion 263 to be casually pressed by the user. The engaging portion 262 is engaged with the engaging slot 2151 to cause the body portion 213 to be unable to disengage from the sliding portion 215.

When the storage unit 20 is pivoted with respect to the attachment unit 10 to be located in the second position, the pressing portion 263 of the flexible member 26 is exposed out of the support 12. The user can press the pressing portion 263 to cause the flexible end 261 to be pivoted. The engaging portion 262 is disengaged from the engaging slot 2151 to cause the body portion 213 to disengage from the sliding portion 215.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A storage device comprising:
an attachment unit including a bracket, a support connected with a bottom end of the bracket, and a first joining member, with the bracket including at least one through-hole adapted for attachment to a bicycle by a fastener, with the support including a first pivoting portion, with the first joining member inserted through the first pivoting portion; and
a storage unit including a container adapted for storing articles and a second joining member, with the container including a second pivoting portion pivotally connected with the first pivoting portion of the support, with the second joining member inserted through the second pivoting portion and engaged with the first joining member, with the storage unit pivotable with respect to the attachment unit about an axis extending through the first and second joining members, with the first pivoting portion including an aperture extending therethrough, two first positioning slots and two second positioning slots, with the first and second joining members inserted through the aperture and connected with each other, with the first and second positioning slots circumferentially arranged around the aperture, with one of the two first positioning slots located at one end of the aperture adjacent to the bracket, with another one of the two first positioning slots located at the other end of the aperture opposite to the bracket, with the second pivoting portion including two first positioning portions engageable in the two first positioning slots or the two second positioning slots, and with the second joining member located between the two first positioning portions, with the second pivoting portion further including two second positioning portions, with the first and second positioning portions circumferentially arranged around the axis with a uniform interval and peripherally spaced 90 degrees from each other, with the first and second positioning slots circumferentially arranged around the aperture with a uniform interval and peripherally spaced 90 degrees from each other, with the two second positioning portions engageable in the two first positioning slots or the two second positioning slots, with the first pivoting portion further including a guiding slot curvely extended around and interconnected with the aperture, with the second pivoting portion further including a guiding portion extended from one end face of the second pivoting portion and located between the second joining member and one of the two first positioning portions, and with the guiding portion engageable in the guiding slot corresponding to a pivotable attachment of the storage unit and the attachment unit.

2. A storage device comprising:
an attachment unit including a bracket, a support connected with a bottom end of the bracket, and a first joining member, with the bracket including at least one through-hole adapted for attachment to a bicycle by a fastener, with the support including a first pivoting portion, with the first joining member inserted through the first pivoting portion; and
a storage unit including a container adapted for storing articles and a second joining member, with the container including a second pivoting portion pivotally connected with the first pivoting portion of the support, with the second joining member inserted through the second pivoting portion and engaged with the first joining member, with the storage unit pivotable with respect to the attachment unit about an axis extending through the first and second joining members, with the storage unit further including a cover, a lever member, and a buckle member, with the cover pivotally connected with the container to form a containing space adapted for storing tools, with the lever member pivotally connected with the cover, with the buckle member pivotally connected with the lever member, with the buckle member engageable with the container, and with the cover pivotable with respect to the container to selectively open the containing space.

3. The storage device as claimed in claim 2, with the first pivoting portion including an aperture extending therethrough, two first positioning slots and two second positioning slots, with the first and second joining members inserted through the aperture and connected with each other, with the first and second positioning slots circumferentially arranged around the aperture, with one of the two first positioning slots located at one end of the aperture adjacent to the bracket, with another one of the two first positioning slots located at the other end of the aperture opposite to the bracket, with the second pivoting portion including two first positioning portions engageable in the two first positioning slots or the two second positioning slots, and with the second joining member located between the two first positioning portions.

4. The storage device as claimed in claim 2, with the cover having a third pivoting portion extended from one end thereof opposite to the containing space, with the lever member having an actuated portion and a first pivoting section disposed opposite to the actuated portion, and with the first pivoting section of the lever member pivotally connected with the third pivoting portion of the cover.

5. The storage device as claimed in claim 4, with the container further including a first buckle portion located on one end thereof adjacent to the second pivoting portion, with the lever member further having a second pivoting section located between the actuated portion and the first pivoting section, with the buckle member having a fourth pivoting portion and a second buckle portion disposed opposite to the fourth pivoting portion, with the fourth pivoting portion pivotally connected with the second pivoting section of the lever member, with the second buckle portion of the buckle member engageable with the first buckle portion of the container.

6. The storage device as claimed in claim 5, with the container further including a body portion, a sliding channel, and a sliding portion, with the body portion pivotally connected with the cover to form the containing space, with the sliding channel and the sliding portion formed on the body portion, with the first buckle portion located between the sliding channel and the cover, with the sliding portion located at one end of the second pivoting portion opposite to the first pivoting portion, and with the sliding channel engageable with the sliding portion to selectively connect the body portion to the sliding portion.

7. The storage device as claimed in claim 6, with the sliding portion having an engaging slot disposed on one end thereof opposite to the second pivoting portion, with the storage unit further including a flexible member arranged at a bottom edge of the sliding channel and forming a flexible end capable of pivoting in relation to the sliding channel, with the flexible member including an engaging portion and a pressing portion both located at the flexible end and extending opposite to the body portion, with the engaging portion engageable with the engaging slot as the flexible end pivoted, and with the pressing portion adapted to be pressed by a user for pivoting the flexible end.

8. A storage device comprising:
an attachment unit including a bracket, a support connected with a bottom end of the bracket, and a first joining member, with the bracket including at least one through-hole adapted for attachment to a bicycle by a fastener, with the support including a first pivoting portion, with the first joining member inserted through the first pivoting portion; and
a storage unit including a container adapted for storing articles and a second joining member, with the container including a second pivoting portion pivotally connected with the first pivoting portion of the support, with the second joining member inserted through the second pivoting portion and engaged with the first joining member, with the storage unit pivotable with respect to the attachment unit about an axis extending through the first and second joining members, with the support integrally formed with a bottom end of the bracket, with the bracket including two through-holes, with the attachment unit further including two symmetrical struts each having a bottom end integrally formed with one end of the support distal the bracket and a top end integrally formed with a respective side edge of the bracket, and with the bracket, the support, and the two struts forming a receiving space adapted to hold a water bottle.

9. A storage device comprising:
an attachment unit including a bracket, a support connected with a bottom end of the bracket, and a first joining member, with the bracket including at least one through-hole adapted for attachment to a bicycle by a fastener, with the support including a first pivoting portion, with the first joining member inserted through the first pivoting portion; and
a storage unit including a container adapted for storing articles and a second joining member, with the container including a second pivoting portion pivotally connected with the first pivoting portion of the support, with the second joining member inserted through the second pivoting portion and engaged with the first joining member, with the storage unit pivotable with respect to the attachment unit about an axis extending through the first and second joining members, with the bracket having an elongated portion and a connecting portion integrally formed with each other and perpendicular to each other, with the bracket including two through-holes extending through the elongated portion and adapted for attachment by a fastener to a bicycle, with the support having a recess disposed opposite to the first pivoting portion, with the connecting portion inserted into the recess, and with the bracket connected with the support.

10. The storage device as claimed in claim 9, with the support having a threaded hole interconnected with the recess, with the attachment unit having a threaded member extending through the connecting portion of the bracket and engaged with the threaded hole of the support.

* * * * *